United States Patent Office 2,909,177
Patented Oct. 20, 1959

2,909,177

SURGICAL SUTURE AND METHOD FOR DYEING

Robert T. Dowd, Lexington, Ky., and Emanuel R. Lieberman, Somerville, and Iwan W. Turiansky, West Orange, N.J., assignors to Ethicon, Inc., a corporation of New Jersey No Drawing. Application November 29, 1957
Serial No. 699,444

12 Claims. (Cl. 128—335.5)

This invention relates to a dyeing process. More particularly, the present invention is concerned with a process for impregnating polyethylene terephthalate with certain coal tar dyes.

Polyethylene terephthalate, a reaction product of ethyleneglycol and terephthalic acid, is an extremely versatile synthetic fiber. In recent years it has been found useful in the manufacture of countless varieties of industrial and consumer products. Because of its unique properties such as strength, durability, shape retention and general resistance to chemical and heat damage, polyethylene terephthalate has proven to be an acceptable substitute for such basic materials as cotton, wool, silk, etc.

Its peculiarly novel physical properties make polyethylene terephthalate useful in the manufacture of surgical supplies. Its tensile strength, resistance to stretch, and non-absorbability in subdermal areas and cavities of living bodies are such that considerable demand has been created for polyethylene terephthalate in the form of surgical sutures, films and mats.

One of the problems which is frequently encountered in the manufacture of new forms of surgical soft goods is that of dyeing the material so that it can be readily discerned by the operating surgeon in a bloody field. Colorless, i.e. white materials are undesirable since they become stained red quickly and cannot be located in the operating cavity.

Although many methods are known for dyeing polyethylene terephthalate, the dyes which are used in these processes are not acceptable for use in dyeing polyethylene terephthalate intended for use in surgical procedures. For example, in accordance with the regulations of the Food and Drug Administration, surgical sutures can be dyed only with those materials which are "certified" by that agency. That is to say, the Food and Drug Administration has prescribed a list of non-toxic dyes which can be used in the manufacture of products intended for contact with mucosal membranes. Dyes other than those on the prescribed list, although otherwise suitable for impregnating polyethylene terephthalate, cannot be used if the synthetic material is intended for use in a body cavity.

Many methods are known for impregnating polyethylene terephthalate with dyes. Among the most common are: (a) application of disperse acetate dyes with the aid of a carrier; (b) application of disperse acetate dyes at elevated temperature under pressure; and (c) combinations of these methods. Unfortunately, none of these methods is operable on the so-called "FDA certified" dyes. Dispersed acetate dyes, although acceptable for impregnating polyethylene terephthalate intended for non-medical use, cannot be employed in the manufacture of surgical products because they do not belong in the "certified" group. Furthermore, the "carriers" usually employed in impregnating polyethylene terephthalate with disperse acetate dyes are unsuitable for FDA certified dyes.

We have now discovered a method for impregnating polyethylene terephthalate with certain dyes, inter alia those certified by the Food and Drug Administration, which is simple, quick and inexpensive. The method is applicable to a wide variety of certified dyes and can be used for impregnating such dyes into surgical materials made of polyethylene terephthalate fiber. In accordance with our method, the desired dye is dissolved in formamide, an alkyl formamide or aqueous mixtures thereof, the polyethylene terephthalate is placed in the solution, the mass is boiled, cooled, and the dyed material is washed with water. If desired, the polyethylene terephthalate may be further boiled in a detergent solution to ensure complete removal of excess dye from the surface. The dyed material is then dried by conventional means.

It will be observed that the basis of our discovery resides in the finding of a solvent which serves simultaneously as a solvent for the dye and as a swelling agent for the polyethylene terephthalate. Although formamide itself may be used for this purpose, we have found it more advantageous to use an alkyl formamide, preferably a a mono- or di-lower alkyl-formamide containing from 1 to 7 carbon atoms in each chain, such as methylformamide, ethylformamide, dimethylformamide or diethylformamide. These solvents may be used in strengths varying from 100% to 30% (aqueous dilution). An optimal strength is from about 60% to 30%, preferably 50% dimethylformamide.

As noted above, the dyes which may be used in accordance with out novel process are those which are soluble in the above mentioned solvents. Generally, these dyes may be defined and classified as oil-soluble or oil-solvent soluble, water insoluble azo, quinoline, anthraquinone, thio-indigo and isoxanthene dyes. It is intended that all such dyes, whether certified by the FDA or not, be embraced within the scope of this invention.

Examples of suitable dyes which may be used in our novel process are:

1-xylylazo-2-naphthol
1-o-tolyl-azo-2-naphthol
1-phenyl-azo-2-naphthylamine
1-o-tolyl-azo-2-naphthylamine
1-p-phenylazo-phenylazo-2-naphthol
1-xylylazo-xylylazo-2-naphthol
1-(o-nitro-p-tolylazo)-2-naphthol
1-(o-chloro-p-nitrophenylazo)-2-naphthol
2-(2-quinolyl)-1,3-indandione
1,4-bis(p-toluino)-anthraquinone
1-hydroxy-4-p-toluinoanthraquinone
5,5'-dichloro-3,3'-dimethyl-thio-indigo
3-ethostearate of 9-o-carboxyphenyl-6-diethylamino-3-isoxanthene
o - [p - ($\beta,\beta'$ - Dihydroxy-diethylamino) - phenylazo]-benzoic acid.

The concentration of dye may be varied over a wide range, depending on the depth of shade desired. One may, for example, vary the concentration between 0.1% and 10%, based on the weight of polyethylene terephthalate to be dyed. The preferred range, for optimal results, is from about 0.5% to about 2%. Quantities upwards of 10% may also be employed, but they are wasteful and unnecessary. Obviously, since the amount of dye to be used depends on the quantity of polyethylene terephthalate to be dyed, the quantities of the latter must be proportionately varied. In general, we have found that a weight:volume ratio (polyethylene terephthalate: solvent) of from about 1:2 to about 1:100 is suitable. The preferred ratio, for optimal results, is from about 1:10 to about 1:50.

As noted above, among the many advantages of our novel process is the speed of the operation. It is well known, for example, that normal dyeing processes demand long periods of time for completion, some requiring as long as several days. Our process, on the other hand, may be completed in from about 1 to 90 minutes, the exact length of time being a matter of choice for one skilled in the art.

The dyeing operation may be carried out at elevated temperatures, preferably at the boiling point of the reaction mixture. The exact temperature range may vary widely and will depend on the desires of those skilled in the art and the boiling point of the solvent employed. In general, where aqueous mixtures of formamide are employed, a temperature of from about 105° C. to about 125° C. is satisfactory, however, the temperature range may be considerably increased if the operation is carried out under superatmospheric pressure and it is intended that this modification of our process be included within the scope of this invention. We have found, for example, that when the dyeing is carried out at the boiling point of the reaction mixture in a sealed flask, the temperature may be advantageously increased up to as much as 200° C. and the length of the dyeing reduced to the lower limits, i.e. from about 1 minute to about 5 minutes.

After the dye has been impregnated into the polyethylene terephthalate and the mass has been cooled, further treatment of the dyed product is conventional. For example, if so desired, one may ensure complete removal of excess dye from the surface of the material by the known method of boiling in a detergent solution. Detergents commonly used for this purpose are the anionic types, such as ordinary soap or the synthetics, e.g. bis-(2-ethylhexyl)-sodium sulfosuccinate or sodium lauryl sulfate; the non-ionic detergents such as alkyl aryl polyether alcohol or alkyl phenyl polyethyleneglycol ether; or the quaternary ammonium compounds such as diisobutyl phenoxy ethoxy ethyldimethyl benzyl ammonium chloride or aryl dimethyl dichlorobenzyl ammonium chloride.

The process of this invention is suitable for dyeing polyethylene terephthalate in any shape or form, including ribbons, fibers, filaments, yarns, monofils, thread and the like, but most advantageously for dyeing materials intended to be used in surgical procedures, i.e. for complete or partial insertion into the body beyond the surface area, for example sutures, films or mats. The dyeing operation, where sutures are involved, may be performed by placing the suture lengths loosely in the formamide solution or, preferably, wound on skeins, frames or drums.

The following examples are intended to illustrate the invention but are not to be construed as limitative on the scope thereof.

*Example I*

Five hundred grams of polyethylene terephthalate (suture) wound on a skein were immersed into a solution containing 1000 ml. of dimethylformamide, 300 ml. water and 2 grams of 1-hydroxy-4-p-toluenoanthraquinone. The solution was heated to 100° C. and kept there for one hour. The skein was continuously rotated to insure uniform uptake of dye. The finished product was washed well with water, spooled, and hot stretched.

*Example II*

One hundred yards of white braided size 5/0 polyethylene terephthalate suture were wound under tension on each of two 21-inch-long frames. Both frames were submerged in a dye bath containing 14.7 liters of 80% formamide-water solution and 5 grams of 1-hydroxy-4-p-toluenoanthraquinone at 125° C. for thirty minutes. Thereafter they were washed with tap water, boiled for ten minutes with 0.1% bis(2-ethylhexyl)-sodium sulfosuccinate (Aerosol–OT) solution and rinsed. After drying at 100° C. for 2 hours, the material was rewound on spools.

*Example III*

One hundred yards of white braided size 4/0 polyethylene terephthalate suture were wound under tension on a 21-inch-long frame. The frame was submerged in a dye bath containing 80% formamide-water solution and 25% (on polyethylene terephthalate basis) of 1-hydroxy-4-p-toluenoanthraquinone at 125° C. for thirty minutes. Thereafter, it was washed with tap water, boiled ten minutes with 0.1% bis(2-ethylhexyl)-sodium sulfosuccinate (Aerosol–OT) solution and rinsed. After drying at 100° C. for 1.5 hours, the dyed material was rewound on a spool.

*Example IV*

Skeins of 1500 yards each of size 0, 2/0, 3/0, 4/0 and 5/0 polyethylene terephthalate sutures were dyed in two batches. The first batch contained two skeins each of sizes 0 and 2/0 and one skein of size 5/0. The second batch contained one skein of 5/0 and two skeins each of sizes 3/0 and 4/0. Five skeins were put on a 21-inch frame without tension and placed in a stainless steel tray. The dyeing solution consisted of 50% formamide-water mixture containing 5% 2-(2-quinolyl)-1,3-indandione on polyethylene terephthalate weight basis. The ratio of polyethylene terephthalate weight:volume of solution was about 1:30. The dyeing was carried out at the boiling temperature of the solution for 1½ hours (first batch) and ½ hour (second batch) respectively. After the first dyeing, the solution was filtered and after addition of dye, reused for the second batch.

The skeins were washed thoroughly with tap water and boiled for fifteen minutes with 0.5% bis (2-ethylhexyl)-sodium sulfosuccinate solution. They were washed again with tap water and dried for one hour at 100° C.

*Example V*

A 2000 ml. heavy walled flask with a pressure lock was filled with 200 ml. of 80% formamide-water solution in which 0.1 gram of 1-hydroxy-4-p-toluenoanthraquinone was dissolved. The concentration of the dye was 10% on fiber weight basis. A silicone oil bath was heated to 200° C. The flask with the solution was pre-heated to about 110° C. A 5" by 1" stainless steel frame with 20 yards of wound polyethylene terephthalate size 3/0 thread was immersed in the dye bath and the pressure lock closed. The flask was immersed in the silicone oil bath for 5 minutes and then removed, cooled and opened. The frame was taken out and washed with tap water boiled for ten minutes with 0.1% bis-(2-ethylhexyl)-sodium sulfosuccinate solution, rinsed and dried at 100° C. for 2 hours.

*Example VI*

Ten yards of white braided size 3/0 polyethylene terephthalate suture in the form of a loose skein were submerged in a dye bath containing 100 ml. of 70% formamide-water solution and 0.1 gram of 1-hydroxy-4-p-toluenoanthraquinone (10% dye concentratio 1 on thread-weight basis) at 105° C. to 110° C. for thirty minutes (the ratio of thread weight:volume of solution, 1:100). The suture was then washed with tap water, boiled and dried as in Example V.

*Example VII*

Ten yards of white braided size 3/0 polyethylene terephthalate suture in the form of a loose skein were submerged in a dye bath containing 100 ml. of 30% formamide-water solution and 1% 1-hydroxy-4-p-toluenoanthraquinone at 110° C. for thirty minutes. (Ratio of thread weight:volume of solution, 1:20.) The suture was then washed, boiled and dried as in Example V.

Example VIII

Fifty yards of white braided size 3/0 polyethylene terephthalate suture in the form of a loose skein were submerged in a dye bath containing 100 ml. of 50% formamide-water solution and 1% of 1-hydroxy-4-p-toluenoanthraquinone (on the basis of thread weight) at 110° C. for thirty minutes. (Ratio of thread weight: volume of solution, 1:20.) The suture was then washed, boiled and dried as in Example V.

Example IX

Twenty yards of white braided size 3/0 polyethylene terephthalate suture in the form of a loose skein were submerged in a dye bath containing 100 ml. of 40% formamide-water solution and 5% 1-hydroxy-4-p-toluenoanthraquinone (on basis of thread weight) at 110° C. for thirty minutes. (Ratio of thread weight:volume of solution, 1:50.) The suture was then washed, boiled and dried as in Example V.

What is claimed is:

1. A dyed surgical suture comprising a strand of polyethylene terephthalate impregnated with a dye selected from the group consisting of 1-xylylazo-2-naphthol, 1-o-tolyl-azo-2-naphthol, 1-phenyl-azo-2-naphthylamine, 1-o-tolyl - azo - 2 - naphthylamine, 1 - p - phenylazo-phenylazo - 2 - naphthol, 1 - xylylazo - xylylazo - 2 - naphthol, 1-(o-nitro-p-tolylazo)-2-naphthol, 1-(o-chloro-p - nitrophenylazo) - 2 - naphthol, 2 - quinolyl) - 1,3-indandione, 1,4-bis(p-toluino)-anthraquinone, 1-hydroxy - 4 - p - toluinoanthraquinone, 5,5' - dichloro - 3,3'-dimethyl - thio - indigo, 3 - ethostearate of 9 - o - carboxyphenyl-6-diethylamino-3-isoxanthene, and o-[p-(β,β'-dihydroxy-diethylamino)-phenylazo]-benzoic acid.

2. A dyed surgical suture comprising a strand of polyethylene terephthalate impregnated with 1-hydroxy-4-p-toluenoanthraquinone.

3. A dyed surgical suture comprising a strand of polyethylene terephthalate impregnated with 2-(2-quinolyl)-1,3-indandione.

4. A process for producing a dyed surgical suture which comprises contacting a skein of polyethylene terephthalate with a solvent selected from the group consisting of formamide, an alkyl formamide and aqueous mixtures thereof containing a dye selected from the group consisting of 1-xylylazo-2-naphthol, 1-o-tolylazo-2-naphthol, 1 - phenyl - azo - 2 - naphthylamine, 1 - o - tolylazo - 2 - naphthylamine, 1 - p - phenylazo-phenylazo-2 - naphthol, 1 - xylylazo - xylylazo - 2 - naphthol, 1-(o - nitro - p - tolylazo) - 2 - naphthol, 1 - (o - chloro-p - nitrophenylazo) - 2 - naphthol, 2 - (2 - quinolyl)-1,3-indandione, 1,4-bis(p-toluino)-anthraquinone, 1-hydroxy - 4 - p - toluinoanthraquinone, 5,5' - dichloro-3,3' - dimethyl - thio - indigo, 3 - ethostearate of 9 - o-carboxyphenyl - 6 - diethylamino - 3 - isoxanthene, and o - [p - (β,β' - dihydroxy - diethylamino) - phenylazo]-benzoic acid, for a period of more than about one minute at a temperature of up to the boiling point of the reaction mixture.

5. A process as set forth in claim 4 wherein the solvent is used in a strength from about 100% to about 50%.

6. A process as set forth in claim 4 wherein the dye concentration is from about 0.1% to about 5%, based on the weight of polyethylene terephthalate employed.

7. A process as set forth in claim 4 wherein the quantity of polyethylene terephthalate is from about 1:2 to about 1:100, based on a polyethylene terephthalate:volume of solution ratio, weight/volume ratio.

8. A process as set forth in claim 4 wherein the alkyl formamide is a mono-lower alkyl-formamide.

9. A process as set forth in claim 4 wherein the alkyl formamide is a di-lower alkyl-formamide.

10. A process as set forth in claim 9 wherein the di-lower alkyl-formamide is dimethyl formamide.

11. A process for producing a dyed surgical suture which comprises contacting a skein of polyethylene terephthalate with a solvent selected from the group consisting of formamide, an alkyl formamide and aqueous mixtures thereof containing 1-hydroxy-4-p-toluenoanthraquinone.

12. A process for producing a dyed surgical suture which comprises contacting a skein of polyethylene terephthalate with a solvent selected from the group consisting of formamide, an alkyl formamide and aqueous mixtures thereof containing 2-(2-quinolyl)-1,3-indandione.

References Cited in the file of this patent

Carpenter: Journal of the Society of Dyers & Colourists, vol. 65, No. 10, October 1949, pp. 469–477, esp. p. 470.

Fern: J.S.D.C., December 1955, pp. 840–856, esp. p. 842 and bibliography.

Prager: Amer. Dyestuff Reporter, vol. 46, No. 14, July 15, 1957, pp. 497–498.